(12) United States Patent
Li et al.

(10) Patent No.: US 12,086,071 B2
(45) Date of Patent: Sep. 10, 2024

(54) METHOD FOR DETERMINING PHYSICAL ADDRESS AND CHIP SYSTEM

(71) Applicant: Huawei Technologies Co., Ltd., Shenzhen (CN)

(72) Inventors: Kailong Li, Hangzhou (CN); Hui Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/042,974

(22) PCT Filed: Aug. 4, 2021

(86) PCT No.: PCT/CN2021/110624
§ 371 (c)(1),
(2) Date: Feb. 24, 2023

(87) PCT Pub. No.: WO2022/042245
PCT Pub. Date: Mar. 3, 2022

(65) Prior Publication Data
US 2023/0342301 A1 Oct. 26, 2023

(30) Foreign Application Priority Data

Aug. 27, 2020 (CN) .......................... 202010881378.2

(51) Int. Cl.
G06F 12/10 (2016.01)
(52) U.S. Cl.
CPC .......... G06F 12/10 (2013.01); G06F 2212/65 (2013.01)

(58) Field of Classification Search
CPC .. G06F 12/10; G06F 12/1009; G06F 12/1027; G06F 12/109; G06F 12/1441; G06F 12/145; G06F 12/1491; G06F 2212/1044; G06F 2212/65; G06F 2212/651; G06F 2212/657; G06F 2212/68
See application file for complete search history.

(56) References Cited

U.S. PATENT DOCUMENTS

| 6,012,132 | A | * | 1/2000 | Yamada | G06F 12/1009 |
| | | | | | 711/205 |
| 10,157,143 | B2 | * | 12/2018 | Xu | G06F 12/1009 |
| 2002/0144079 | A1 | * | 10/2002 | Willis | G06F 12/1027 |
| | | | | | 711/205 |
| 2006/0149919 | A1 | * | 7/2006 | Arizpe | G06F 12/1009 |
| | | | | | 710/22 |

* cited by examiner

Primary Examiner — Aracelis Ruiz
(74) Attorney, Agent, or Firm — Slater Matsil, LLP

(57) ABSTRACT

A method includes: when a first virtual address of a first virtual address space is obtained, determining a first entry index address corresponding to the first virtual address; and determining, from a first page table based on the first entry index address, a first target physical address corresponding to the first virtual address. A second entry index address corresponding to a start virtual address of the first virtual address space is greater than or equal to a base address of the first page table, and is less than a sum of the base address of the first page table and a quotient of dividing the start virtual address by a size of a second virtual address space.

19 Claims, 10 Drawing Sheets

| | 31 | 24 | 20 | 18 | | 10 | | 1 | 0 |
|---|---|---|---|---|---|---|---|---|---|
| Base address of a level-2 page table | | | | | | | | 0 | 1 |
| Physical address base address (1 MB) | | | | 0 | | | | 1 | 0 |
| Physical address base address (16 MB) | | | | 1 | | | | 1 | 0 |

FIG. 3

| | 31 | | 16 | 12 | | 1 | 0 |
|---|---|---|---|---|---|---|---|
| Physical address base address (64KB) | | | | | | 0 | 1 |
| Physical address base address (4KB) | | | | | | 1 | 0 |

FIG. 4

METHOD FOR DETERMINING PHYSICAL ADDRESS AND CHIP SYSTEM

CROSS-REFERENCE TO RELATED APPLICATIONS

This application is a National Stage of International Application No. PCT/CN2021/110624, filed on Aug. 4, 2021, which claims priority to Chinese Patent Application No. 202010881378.2, filed on Aug. 27, 2020. Both of the aforementioned applications are hereby incorporated by reference in their entireties.

TECHNICAL FIELD

This application relates to the field of operating systems, and in particular, to a method for determining a physical address and a chip system.

BACKGROUND

A chip system in an electronic device usually includes a central processing unit (central processing unit, CPU), a memory, and a coprocessor. The CPU accesses the memory in a running process to obtain or store data. The coprocessor is configured to perform an operation that cannot be or does not need to be performed by the CPU. Currently, an access address used by a CPU to access a memory is a virtual address, and a memory management unit (memory management unit, MMU) in the coprocessor may translate the virtual address into a corresponding physical address. Therefore, how to determine the physical address attracts increasing attention.

In the conventional technology, when the MMU receives a virtual address access request from a CPU for a virtual address space, the MMU may obtain, from the memory, a level-1 page table corresponding to the virtual address space. The level-1 page table includes a plurality of entries, and each entry includes an association relationship between an entry index address and a physical address. The MMU obtains a corresponding entry index address from the level-1 page table based on the virtual address, and then determines, from the level-1 page table based on the entry index address, a physical address corresponding to the virtual address.

However, a start virtual address of the virtual address space may not start from 0, but the entries included in the level-1 page table are usually allocated based on a virtual address 0 to the maximum virtual address of the virtual address space. As a result, a quantity of entries in the level-1 page table is greater than a quantity of entries actually required by the virtual address space, some entries with relatively low addresses in the level-1 page table are not used, memory space occupied by these entries is wasted, and memory utilization is relatively low.

SUMMARY

In view of this, this application provides a method for determining a physical address and a chip system, to reduce memory occupied by a page table and improve memory utilization.

To achieve the foregoing objective, a first aspect provides a method for determining a physical address, including: when a first virtual address of a first virtual address space is obtained, determining a first entry index address corresponding to the first virtual address; and determining, from a first page table based on the first entry index address, a first target physical address corresponding to the first virtual address.

The first page table is used to determine a physical address corresponding to each virtual address in the first virtual address space, a start virtual address of the first virtual address space corresponds to a second entry index address in the first page table, the second entry index address is greater than or equal to a base address of the first page table and less than a sum of the base address of the first page table and a quotient of dividing the start virtual address by a size of a second virtual address space, a largest entry index address of the first page table is less than a sum of the base address of the first page table and a quotient of dividing a largest virtual address of the first virtual address space by the size of the second virtual address space, and the second virtual address space is virtual address space associated with any entry in the first page table. In other words, the second virtual address space may be a subset of the first virtual address space.

It should be noted that the page table is a special data structure stored in a memory. The page table may be used as an index of the virtual address space and may include a plurality of entries. Each entry includes an association relationship between an entry index address and a physical address. The physical address may be carried in a page table descriptor of the entry. The page table descriptor may be used to indicate a base address of a next-level page table or a base address of a physical address corresponding to the virtual address.

In this embodiment of this application, when obtaining the first virtual address in the first virtual address space, the MMU may determine the first entry index address corresponding to the first virtual address in the first page table, and determine, from the first page table based on the first entry index address, the first target physical address corresponding to the first virtual address. The first page table may be used to determine a physical address corresponding to each virtual address in the first virtual address space, the start virtual address of the first virtual address space corresponds to the second entry index address in the first page table, the second entry index address is greater than or equal to the base address of the first page table, and is less than the sum of the base address of the first page table and the quotient of dividing the start virtual address by the size of the second virtual address space, the largest entry index address of the first page table is less than the sum of the base address of the first page table and the quotient of dividing the largest virtual address of the first virtual address space by the size of the second virtual address space, and the second virtual address space is virtual address space associated with any entry in the first page table. Therefore, the first page table may include at least an entry actually required by the first virtual address space. This saves memory and improves memory utilization.

Optionally, a second page table corresponding to the first virtual address space may be obtained in advance (for example, before the first entry index address corresponding to the first virtual address is determined when the first virtual address of the first virtual address space is obtained). If a fourth entry index address is greater than a base address of the second page table, it may be determined that an unused entry exists in the second page table, page table descriptors in the second page table may be sequentially offset downward by entries of a first entry quantity, and entries of a first entry quantity in a high address part of the second page table are deleted, so as to obtain the first page table corresponding to the first virtual address space.

A fourth entry index address is an entry index address, in the second page table, corresponding to the start virtual address of the first virtual address space. When the page table descriptors in the second page table are sequentially offset downward by the entries of the first entry quantity, the fourth entry index address is the same as the second entry index address.

Optionally, the first entry quantity may be greater than 0 and less than or equal to a second entry quantity.

The second entry quantity may be a maximum value by which a page table descriptor in the second page table can be offset downwards. The second entry quantity may be calculated in a plurality of manners, but calculation results in the plurality of calculation manners may be the same. For example, the second entry quantity=the start virtual address of the first virtual address space/the size of the second virtual address space, or the second entry quantity=the entry quantity of the second page table—the size of the first virtual address space/the size of the second virtual address space.

It should be noted that a larger first entry quantity indicates a larger entry offset amplitude and larger saved memory. The second page table and the first page table are used as an example, memory saved by the first page table and the second page table=a first entry quantity×a memory size occupied by each entry in the second page table (or the first page table).

Certainly, in actual application, the first virtual address space may also be obtained first. If the start virtual address of the first virtual address space is greater than 0, the fourth entry index address in the second page table may be greater than the base address of the second page table. Therefore, the page table descriptor of the second page table may be sequentially offset downward by the entries of the first entry quantity corresponding to the second page table, to obtain the first page table.

Optionally, the determining a first entry index address corresponding to the first virtual address includes: determining a second virtual address based on the first virtual address and a first offset value, where the first virtual address is greater than the second virtual address, and the first offset value is less than or equal to the start virtual address of the first virtual address space; and determining the first entry index address based on the second virtual address. The first offset value=the first entry quantity corresponding to the first page table*the size of second virtual address space associated with each entry of the first page table.

When an arithmetic logic unit (arithmetic logic unit, ALU) completes offsetting on the first virtual address and determines the second virtual address, the MMU may determine the base address of the first page table, and determine the first entry index address based on the base address of the first page table and the second virtual address. In addition, when the first target physical address corresponding to the first virtual address is determined, searching is sequentially performed from the level-1 page table, a level-2 page table, a level-3 page table . . . , until the corresponding first target physical address is found. Therefore, the first entry index address may be determined based on the base address of the first page table and the second virtual address in the following two possible implementations:

In a possible implementation, when the first page table is the level-1 page table, the first virtual address may be compared with a virtual address space corresponding to each translation table base register (translation table base register, TTBR). If the first virtual address belongs to a virtual address space corresponding to a TTBR (the first virtual space may be a subset of the virtual address space corresponding to the TTBR), the base address of the first page table is obtained from the TTBR corresponding to the virtual address space. A sum of the base address of the first page table and a level-1 page table index bit in the second virtual address is determined as the first entry index address.

In another possible implementation, when the first page table is a secondary page table, the base address of the first page table may be determined based on a third page table, and the first entry index address is determined based on the base address of the first page table and the second virtual address, where the third page table is a previous-level page table adjacent to the first page table.

Optionally, the determining a first entry index address corresponding to the first virtual address includes: determining, based on the first virtual address, a third entry index address to be offset; and determining the first entry index address based on the third entry index address and a second offset value, where the third entry index address is greater than the first entry index address, and the second offset value=the first entry quantity.

It can be learned from the foregoing that, in a process of determining the first target physical address corresponding to the first virtual address, the MMU may need to search for a plurality of levels of page tables. The first page table may be any level of page table, that is, any page table may have an offset. If the MMU first offsets the first virtual address by using the ALU to obtain the second virtual address, and then determines the corresponding first entry index address from the first page table based on the second virtual address, regardless of which page tables in the plurality of levels of page tables are offset, the obtained second virtual address may match the offset page table provided that the first virtual address is offset at least once. If the MMU first determines the to-be-offset third entry index address based on the first virtual address, and then offsets the third entry index address to obtain the first entry index address, when determining the first entry index address in the offset page table at each layer, the MMU may separately offset the third entry index address for the page table to obtain the first entry index address.

Optionally, before the determining a first entry index address corresponding to the first virtual address, the method further includes: obtaining page table offset flag information, where the page table offset flag information is used to indicate to determine, based on the first page table, the first target physical address corresponding to the first virtual address.

Optionally, the page table offset flag information is indicated by an offset indicator bit in a translation table base control register (translation table base control register, TTBCR), and the obtaining page table offset flag information includes: when a value of the offset indicator bit in the TTBCR is a first indicator, determining that the page table offset flag information is obtained.

Optionally, the method further includes:
setting the value of the offset indicator bit in the TTBCR to the first indicator.

Optionally, the first page table is the level-1 page table or the level-2 page table.

Optionally, the first virtual address space is kernel mode address space.

An address range of the kernel mode address space may be 0x80000000 to 0xFFFFFFFF.

According to a second aspect, a chip system is provided, where the chip system includes at least one CPU, at least one memory, and at least one coprocessor, and the at least one coprocessor includes at least one MMU. The at least one MMU is configured to: when an access request initiated by the at least one CPU for the at least one memory is received, and the access request carries a first virtual address of a first virtual address space, determine a first entry index address corresponding to the first virtual address; determine, from a first page table based on the first entry index address, a first target physical address corresponding to the first virtual address. The first page table is used to determine a physical address corresponding to each virtual address in the first virtual address space, a start virtual address of the first virtual address space corresponds to a second entry index address in the first page table, the second entry index address is greater than or equal to a base address of the first page table and less than a sum of the base address of the first page table and a quotient of dividing the start virtual address by a size of a second virtual address space, a largest entry index address of the first page table is less than a sum of the base address of the first page table and a quotient of dividing a largest virtual address of the first virtual address space by the size of the second virtual address space, and the second virtual address space is virtual address space associated with any entry in the first page table.

Optionally, the at least one MMU includes at least one ALU.

The at least one ALU is configured to determine a second virtual address based on the first virtual address and a first offset value, where the first virtual address is greater than the second virtual address.

The at least one MMU is further configured to determine the first entry index address based on the second virtual address.

Optionally, the at least one MMU is further configured to: determine, based on the first virtual address, a third entry index address to be offset; and determine the first entry index address based on the third entry index address and a second offset value, where the third entry index address is greater than the first entry index address.

Optionally, the at least one MMU further includes at least one TTBCR, and the at least one MMU is further configured to:

obtain page table offset flag information, where the page table offset flag information is indicated by an offset indicator bit in the at least one TTBCR.

Optionally, the MMU further includes at least one TTBR, and each TTBR may store a base address of one level-1 page table. Correspondingly, the TTBCR may be used to indicate TTBRs selected when physical addresses corresponding to virtual addresses in different virtual address spaces are determined. In other words, the TTBRs corresponding to the different virtual address spaces are determined.

Optionally, the at least one coprocessor may be integrated into the at least one CPU.

According to a third aspect, an electronic device is provided, where the electronic device includes the chip system according to any implementation of the second aspect.

According to a fourth aspect, a computer program product is provided. When the computer program product runs on an electronic device, the electronic device is enabled to perform the method according to any implementation of the first aspect.

It may be understood that, for beneficial effects of the second aspect to the fourth aspect, reference may be made to the related descriptions in the first aspect. Details are not described herein again.

BRIEF DESCRIPTION OF THE DRAWINGS

FIG. 3 is a schematic diagram of a structure of a page table descriptor of a level-1 page table according to an embodiment of this application;

FIG. 4 is a schematic diagram of a structure of a page table descriptor of a level-2 page table according to an embodiment of this application;

DETAILED DESCRIPTION OF ILLUSTRATIVE EMBODIMENTS

A method for determining a physical address in embodiments of this application may be applied to an electronic device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), or a server. A specific type of the electronic device is not limited in embodiments of this application.

Figure 1:
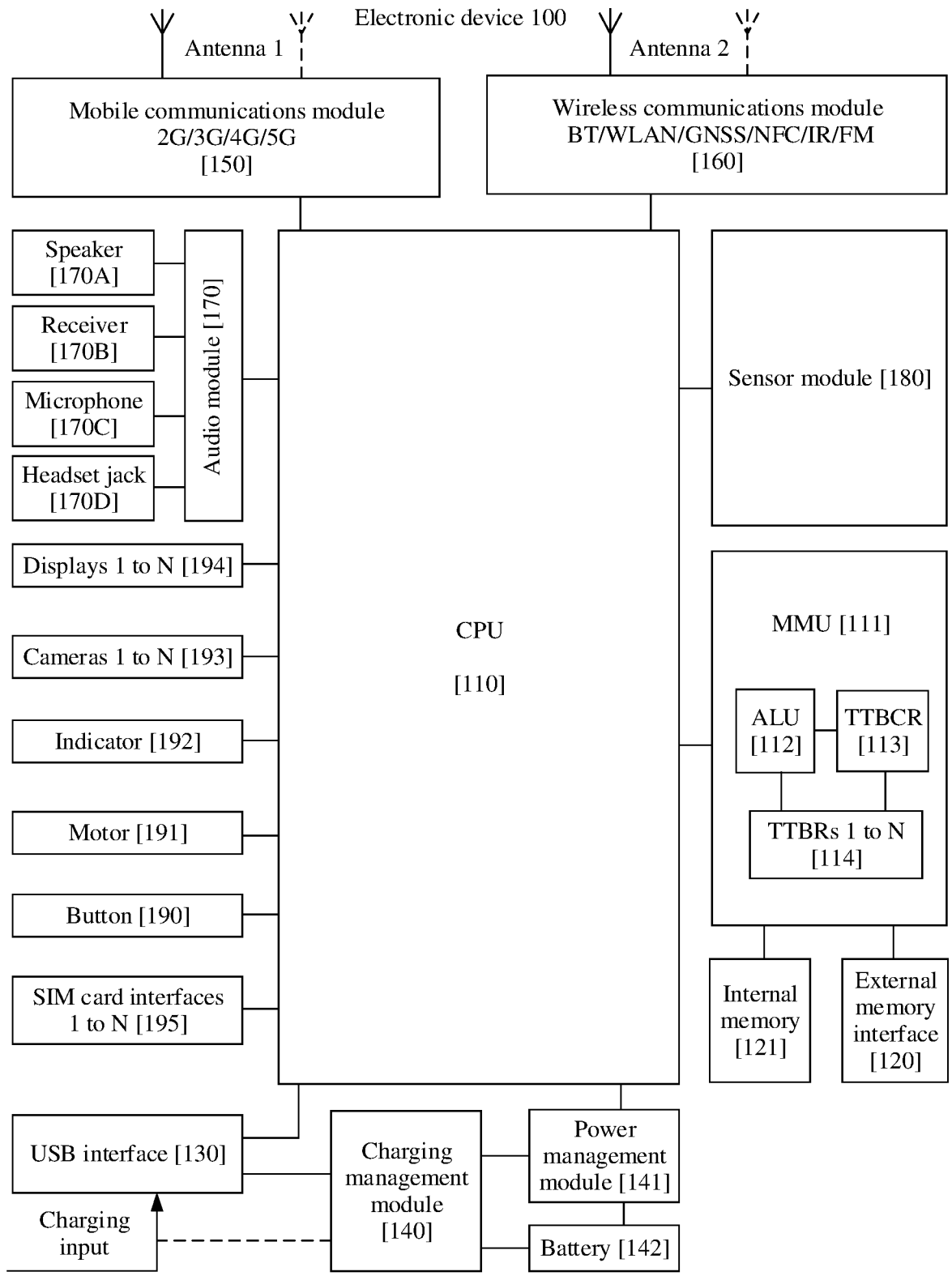
FIG. 1 is a schematic diagram of a structure of an electronic device according to an embodiment of this application.

FIG. 1 is a schematic diagram of a structure of an electronic device 100 according to an embodiment of this application. The electronic device 100 may include a CPU 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor L, a bone conduction sensor, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The CPU 110 may include one or more processing units. For example, the CPU 110 may include an application processor (application processor, AP), a modem processor, a graphics processing unit (graphics processing unit, GPU), an image signal processor (image signal processor, ISP), a controller, a memory, and a video codec, a digital signal processor (digital signal processor, DSP), a baseband processor, and/or a neural-network processing unit (neural-network processing unit, NPU), and the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

In some embodiments, the CPU 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the CPU 110 may include a plurality of groups of I2C buses. The CPU 110 may be separately coupled to the touch sensor, a charger, a flash, the camera 193, and the like by using different I2C bus interfaces. For example, the CPU 110 may couple the touch sensor by using the I2C interface, so that the CPU 110 communicates with the touch sensor by using the I2C bus interface, to implement a touch function of the electronic device 100.

The I2S interface may be configured to perform audio communication. In some embodiments, the CPU 110 may include a plurality of groups of I2S buses. The CPU 110 may be coupled to the audio module 170 by using the I2S bus, to implement communication between the CPU 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the CPU 110 to the wireless communications module 160. For example, the CPU 110 communicates with the Bluetooth module in the wireless communications module 160 by using the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the CPU 110 to peripheral components such as the display 194 and the camera 193. The MIPI interface includes a camera serial interface (camera serial interface, CSI), a display serial interface (display serial interface, DSI), and the like. In some embodiments, the CPU 110 communicates with the camera 193 by using the CSI interface, to implement a photographing function of the electronic device 100. The CPU 110 communicates with the display 194 by using the DSI interface, to implement a display function of the electronic device 100.

The GPIO interface may be configured by software. The GPIO interface may be configured as a control signal or a data signal. In some embodiments, the GPIO interface may be configured to connect the CPU 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device 100, for example, an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device 100 through the power management module 141 while charging the battery 142.

The power management module 141 is configured to connect the battery 142, the charging management module 140, and the CPU 110. The power management module 141 receives input of the battery 142 and/or the charging management module 140, and supplies power to the CPU 110, the internal memory 121, the external memory, the display 194, the camera 193, the wireless communications module 160, and the like. The power management module 141 may further be configured to monitor parameters such as a battery capacity, a battery cycle count, and a battery health state (electric leakage or impedance). In some other embodiments, the power management module 141 may alternatively be disposed in the CPU 110. In some other embodiments, the power management module 141 and the charging management module 140 may alternatively be disposed in a same component.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution applied to the electronic device 100 for wireless communication such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the CPU 110. In some embodiments, at least some functional modules of the mobile communications module 150 and at least some modules of the CPU 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the CPU 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications MMU. The wireless communications module 160 receives an electromagnetic wave by using the antenna 2, performs frequency modulation and filtering processing on the electromagnetic wave signal, and sends a processed signal to the CPU 110. The wireless communications module 160 may further receive a to-be-sent signal from the CPU 110, perform frequency modulation and amplification on the signal, and convert the signal into an electromagnetic wave by using the antenna 2 and radiate the electromagnetic wave.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The CPU 110 may include one or more GPUs, and the GPUs execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the CPU 110 by using the external memory interface 120, to implement a data storage function. For example, files such as music and videos are stored in the external storage card.

The internal memory 121 may be configured to store computer-executable program code. The executable program code includes instructions. The CPU 110 executes various functional applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data or an address book) created during use of the electronic device 100, and the like. In addition, the internal memory 121 may include a high-speed random access memory, or may include a nonvolatile memory such as at least one disk storage device, a flash memory, or a universal flash storage (universal flash storage, UFS).

An MMU 111 may be disposed in a coprocessor (not shown in FIG. 1), and the coprocessor may be disposed between the CPU 110 and a bus of the internal memory 121 and the external memory interface 120. When the CPU 110 needs to access the internal memory 121 (that is, the memory in the foregoing), a virtual address may be provided, and the MMU maps the virtual address to a physical address, so that the CPU 110 can read or write data to the internal memory 121 based on the physical address.

The virtual address is an address in an address space that can be identified or generated by an operating system in the electronic device, and a size range of the virtual address may be determined by a quantity of bits of the operating system running in the CPU 110. For example, if the operating system running in the CPU 110 is 32 bits, and the virtual address is also 32 bits, the address range of the virtual address is 0 to 0xFFFFFFFF (4 GB). If the operating system running in the CPU 110 is 64 bits, and the virtual address is also 64 bits, the address space of the virtual address is 0 to 0xFFFFFFFFFFFFFFFF (16EB).

The virtual address may be divided into a plurality of virtual address spaces based on an actual requirement, for example, a user mode address space and a kernel mode address space. The user mode address space may be accessed by a user mode program (for example, reading, writing, opening, closing, or drawing) and a kernel mode program (for example, process management, storage management, file management, or device management). The kernel mode address space may be accessed only by the kernel mode program during running.

The physical address may be an address in the address space actually owned by a hardware storage device such as the internal memory 121. The address space of the physical address may be less than the address space of the virtual address. For example, when a size of the address space of the virtual address may be 4 GB, a size of the address space of the physical address may be 256 MB.

The MMU 111 may include several ALUs 112 (only one is shown in FIG. 1), a TTBCR 113, and several TTBRs 114 (only two are shown in FIG. 1).

The TTBCR 113 may be configured to store TTBR-related control information, for example, specify a TTBR 114 corresponding to the kernel mode address space and the user mode address space. In this embodiment of this application, a reserved bit in the TTBCR 113 may be further used to indicate whether to offset the virtual address before the virtual address is mapped.

The TTBR 114 may be used to indicate a base address of the level-1 page table (that is, an entry index address of a first entry in the level-1 page table). The ALU 112 may be configured to perform a logical operation, for example, offset a virtual address upward or downward.

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the CPU 110, or some function modules of the audio module 170 are disposed in the CPU 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture.

When the CPU in the electronic device accesses the memory, the CPU sends the virtual address to the MMU. The MMU maps the virtual address to the corresponding physical address, that is, translates the access to the virtual address into the access to the physical memory, so as to save a physical address space and protect the physical address space. The MMU may use a paging mechanism to manage the virtual address space by using a page as a unit, and each page may include a virtual address space of a preset size.

The virtual address space may include more than one virtual address, and one virtual address space may correspond to one page table set. The page table set may be used to determine a physical address corresponding to a virtual address of the virtual address space. The page table set may include one level-1 page table, or the page table set may include one level-1 page table and at least one secondary page table. The secondary page table may include a level-2 page table, a level-3 page table, or even a lower-level page table. Correspondingly, the MMU may determine, through at least level-1 mapping, the physical address corresponding to the virtual address, and a level of mapping is consistent with a level of the page table set. For example, when the physical address corresponding to the virtual address is determined through level-1 mapping, the level-1 mapping is referred to as segment mapping, and the page table set may include only level-1 page table. When the physical address corresponding to the virtual address is determined through level-2 mapping, the level-2 mapping is referred to as page mapping, and the page table set may include one level-1 page table and at least one level-2 page table.

The page table is a special data structure stored in the memory. The page table may be used as an index of the virtual address space and may include a plurality of entries. Each entry includes an association relationship between an entry index address and a physical address. The physical address may be carried in a page table descriptor of the entry. The page table descriptor may be used to indicate a base address of a next-level page table or a base address of a physical address corresponding to the virtual address. For example, in the level-1 mapping, a page table descriptor in the level-1 page table is used to indicate a segment base address, and the segment base address is a base address of a physical address corresponding to a virtual address. In level-2 mapping, the page table descriptor in the level-1 page table is used to indicate a base address of the level-2 page table, the page table descriptor in the level-2 page table may be used to indicate a page base address, and the page base address is a physical address base address of a page corresponding to the virtual address.

Certainly, in an actual application, the page table descriptor may be further used to indicate more information related to virtual-physical address mapping. For example, the page table descriptor further includes a mapping level indicator bit and a granularity indicator bit. The mapping level indicator bit may be used to indicate a mapping level of current mapping or whether a mapping level indicator bit (that is, level-1 mapping or level-2 mapping) of a next-level mapping exists. The granularity indicator bit may be used to indicate a granularity indicator bit of segment mapping or page mapping (that is, a size of a virtual address space associated with a page table).

Figure 2:
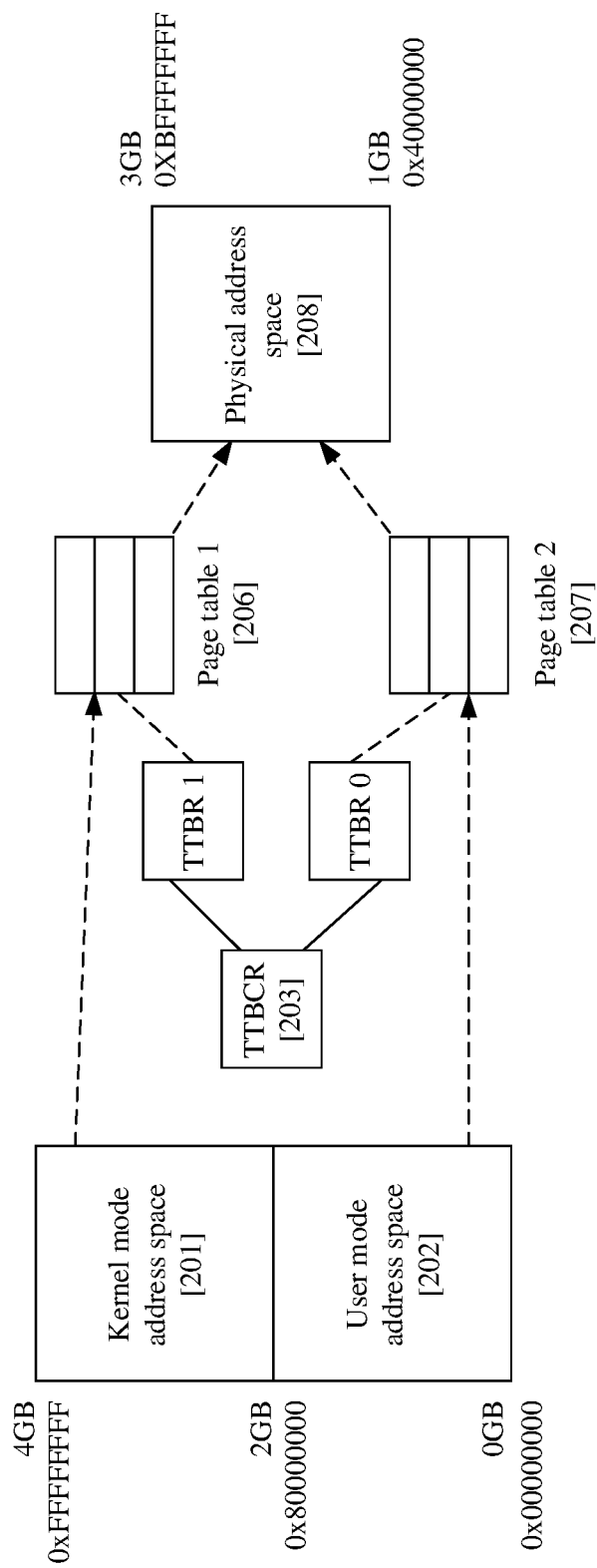
FIG. 2 is a schematic diagram of a logical relationship among a virtual address space, a page table, and a physical address space according to an embodiment of this application.

FIG. 2 is a schematic diagram of a logical relationship among a virtual address space, a page table, and a physical address space according to an embodiment of this application. An address range of the virtual address space is [0x00000000, 0xFFFFFFFF], and a size of the virtual address space is 4 GB. An address range of a user mode address space is [0x00000000, 0x80000000) (that is, the $0^{th}$ GB to the $2^{nd}$ GB), an address range of a kernel mode address space is [0x80000000, 0xFFFFFFFF] (that is, the $2^{nd}$ GB to the $4^{th}$ GB), an address range of the physical address space is (0x40000000, 0XBFFFFFFF), and a size is 2 GB. A base address of a page table 1 that is stored in a TTBR 1 is set through the TTBCR. A physical address in the physical address space to which a virtual address of a kernel mode address space 201 is mapped is determined through the page table 1. Based on a base address of a page table 2 that is stored in a TTBR 0, a physical address in the physical address space to which a virtual address of the user mode address space is mapped is determined through a page table 2.

FIG. 3 is a schematic diagram of a page table descriptor of a level-1 page table according to an embodiment of this application. In a 32-bit operating system, a $0^{th}$ bit and a $1^{st}$ bit of the page table descriptor are mapping level indicator bits. When the $[1:0]^{th}$ bits (that is, the $0^{th}$ bit and the $1^{st}$ bit) are 10, current mapping is level-1 mapping (that is, segment mapping), and the highest 12 or 8 bits in the page table descriptor store a segment base address. When the $[1:0]^{th}$ bits are 01, the current mapping is level-2 mapping (that is, page mapping), and the most highest 22 bits in the page table descriptor store a base address of a level-2 page table. An $18^{th}$ bit of the page table descriptor may be a mapping granularity indicator bit. When the $[18]^{th}$ bit is 0, a mapping granularity is 1 MB, and the most highest 12 bits in the page table descriptor store a segment base address. When the $[18]^{th}$ bit is 1, the mapping granularity is 16 MB, and the most highest 8 bits in the page table descriptor store a segment base address.

FIG. 4 is a schematic diagram of a structure of a page table descriptor of a level-2 page table according to an embodiment of this application. In a 32-bit operating system, the $[1:0]^{th}$ bits in the page table descriptor are mapping granularity indicator bits. When the $[1:0]^{th}$ bits are 10 or 11, a mapping granularity is 4 KB, and the highest 20 bits in the page descriptor are a page base address. When the $[1:0]^{th}$ bits are 01, the mapping granularity is 64 KB, and the highest 16 bits in the page descriptor are the page base address.

In addition, based on different mapping levels, bits of a virtual address in the virtual address space also have different meanings. The virtual address may include at least a level-1 page table index bit and a physical address offset bit. Each level of index bit may be used to indicate a specific location of a page table descriptor corresponding to the virtual address in the level of page table. A physical address offset bit may be used to indicate an offset of a physical address corresponding to the virtual address. A sum of the physical address offset bit and a physical address base address (for example, a segment base address or a page base address) determined by a page table set corresponding to the virtual address space is a physical address corresponding to the virtual address.

For example, the operating system in the electronic device is 32 bits, level-1 mapping is used. A mapping granularity is 1 MB, $[31:20]^{th}$ bits in the virtual address are level-1 page table index bits, and $[19:0]^{th}$ bits are segment offset bits. Alternatively, when level-2 mapping is used, a mapping granularity is 4 KB, $[31:20]^{th}$ bits in a second virtual address are level-1 page table index bits, $[19:12]^{th}$ bits are level-2 page table index bits, and $[11:0]^{th}$ bits are page offset bits.

It can be learned from the foregoing description that a start virtual address of the virtual address space may not start from 0. However, in some embodiments, the page table is used as an index of the virtual address space, and entries included in the page table are allocated based on the virtual address from 0 to the maximum virtual address of the virtual address space. Therefore, a quantity of entries in the page table is greater than a quantity of entries actually required by the virtual address space, some entries with relatively low index addresses in the page table are not used, memory space occupied by these entries is wasted, and memory usage is low.

Figure 5:
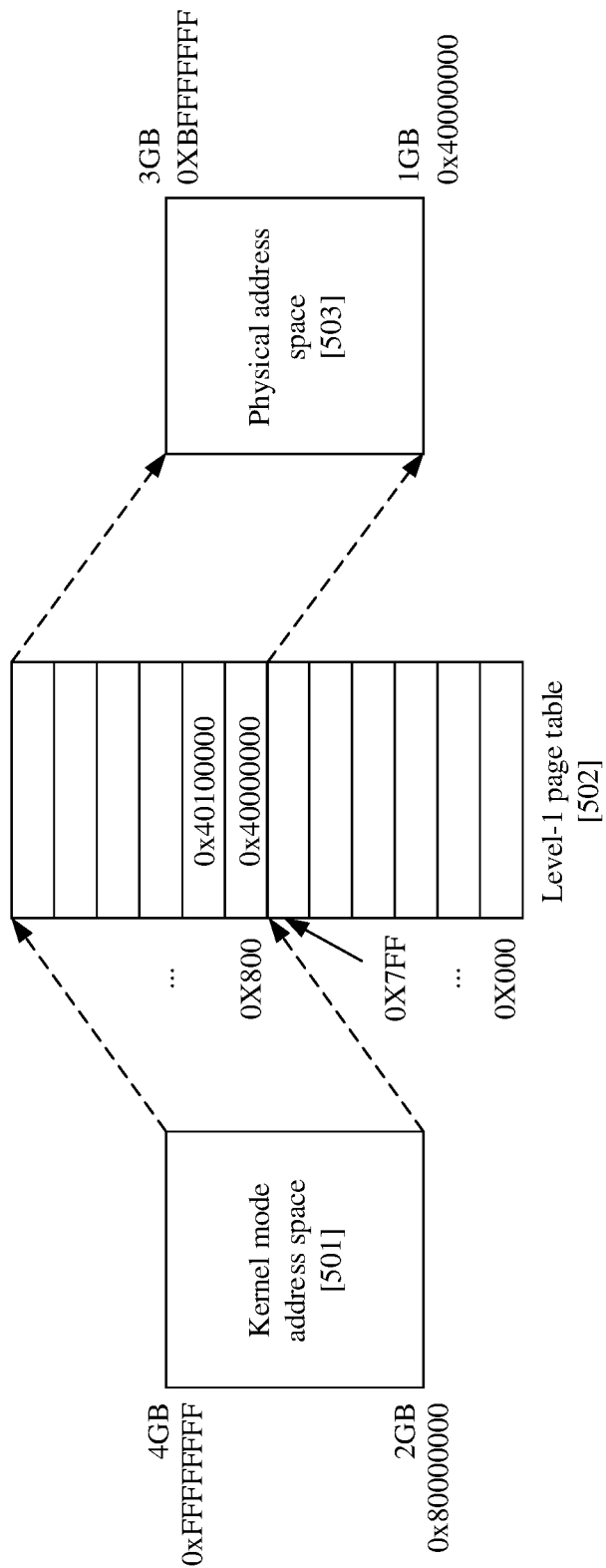
FIG. 5 is a schematic diagram of another logical relationship among a virtual address space, a page table, and a physical address space according to an embodiment of this application.

FIG. 5 is a schematic diagram of a logical relationship between a virtual address space, a page table, and a physical address space. In a 32-bit operating system, an address range of a kernel mode address space 501 is [0x80000000, 0xFFFFFFFF], an address range of a physical address space 503 is [0x40000000, 0XBFFFFFFF], mapping is performed through a level-1 page table 502 (that is, the level-1 page table 502 corresponds to the kernel mode address space 501). Each entry in the level-1 page table is associated with a 1 MB virtual address. Therefore, a total of 4 GB/1 MB=4K (that is, 4096) entries are required, each entry needs to occupy 4 B memory, and the level-1 page table 402 needs to occupy 16 KB memory in total. A start address of the kernel mode address space 501 is 0x80000000, and a corresponding entry index is 0x80000000/0x100000=0x800. Based on the entry index 0x800, it may be determined that a physical address corresponding to 0x80000000 is 0x40000000. However, it can be learned from FIG. 5 that, in this level-1 page table 501, when the physical address corresponding to the virtual address in the kernel mode address space 501 is determined, only 2K (that is, 2048) entries which are greater than or equal to 0x800 in a high address direction are actually occupied. The 2K entries include a page table descriptor, and 2K entries in a low address direction [0X000, 0X7FF] are not used. Therefore, the 8 KB memory occupied by the 2K entries in the low-address direction is wasted. Similarly, a same problem also exists in secondary page tables such as a level-2 page table and a level-3 page table.

To resolve this technical problem, an embodiment of this application provides a method for determining a physical address.

In this embodiment of this application, when obtaining the first virtual address in the first virtual address space, the MMU may determine the first entry index address corresponding to the first virtual address in the first page table, and determine, from the first page table based on the first entry index address, the first target physical address corresponding to the first virtual address. The first page table may be used to determine a physical address corresponding to each virtual address in the first virtual address space, the start virtual address of the first virtual address space corresponds to the second entry index address in the first page table, the second entry index address is greater than or equal to the base address of the first page table, and is less than the sum of the base address of the first page table and the quotient of dividing the start virtual address by the size of the second virtual address space, the largest entry index address of the first page table is less than the sum of the base address of the first page table and the quotient of dividing the largest virtual address of the first virtual address space by the size of the second virtual address space, and the second virtual address space is virtual address space associated with any entry in the first page table. Therefore, the first page table may include at least an entry actually required by the first virtual address space. This saves memory and improves memory utilization.

Specific embodiments are used below to describe in detail the technical solutions of this application. The following several specific embodiments may be combined with each other, and a same or similar concept or process may not be described repeatedly in some embodiments.

Before the MMU performs, for the first time, the method for determining the physical address provided in this embodiment of this application, initialization setting needs to be performed on the MMU.

Figure 6:
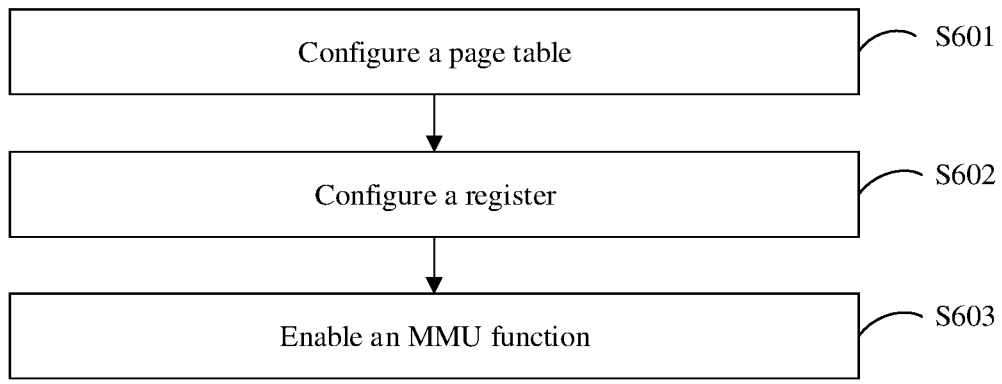
FIG. 6 is a flowchart of mapping initialization setting according to an embodiment of this application.

FIG. 6 is a flowchart of mapping initialization setting according to an embodiment of this application.

S601: Configure a page table.

To reduce memory occupied by a page table, for a page table in which a quantity of included entries is greater than a quantity of page tables actually required by a corresponding virtual address space, a page table descriptor in the page table may be offset downward (that is, in a low address direction) based on a position in the page table. In this way, a quantity of unused entries is reduced, and saved storage space may be released or used as common memory.

Optionally, a second page table corresponding to a first virtual address space may be obtained. If a fourth entry index address is greater than a base address of a second page table, it may be determined that an unused entry exists in the second page table, page table descriptors in the second page table may be sequentially offset downward by entries of the first entry quantity, and entries of the first entry quantity in the high address part of the second page table are deleted, so as to obtain a first page table corresponding to the first virtual address space.

The first page table and the second page table may be used to determine a physical address corresponding to each virtual address in the first virtual address space. The fourth entry index address is an entry index address, in the second page table, corresponding to a start virtual address of the first virtual address space. When the page table descriptors in the second page table are sequentially offset downward by the entries of the first entry quantity, the fourth entry index address is the same as a second entry index address, and the second entry index address is an entry index address, in the first page table, corresponding to a start address of the first virtual address space. The first page table may include at least one entry. The start virtual address of the first virtual address space corresponds to a second entry index address of the first page table. The second entry index address is greater than or equal to a base address of the first page table, and is less than a sum of the base address of the first page table and a quotient of dividing the start virtual address of the first virtual address space by the size of the second virtual address space associated with the entry. The largest entry index address of the first page table is less than a sum of the base address of the first page table and a quotient of dividing the largest virtual address of the first virtual address space by the size of the second virtual address space. The second virtual address space may be a virtual address space corresponding to each entry in the first page table or the second page table, and the second virtual address space may be a subset of the first virtual address space.

Optionally, the first entry quantity may be greater than 0 and less than or equal to a second entry quantity.

The second entry quantity may be a maximum value by which a page table descriptor in the second page table can be offset downwards. The second entry quantity may be calculated in a plurality of manners, but calculation results in the plurality of calculation manners may be the same. For example, the second entry quantity=the start virtual address of the first virtual address space/the size of the second virtual address space, or the second entry quantity=the entry quantity of the second page table—the size of the first virtual address space/the size of the second virtual address space.

It should be noted that a larger first entry quantity indicates a larger entry offset amplitude and larger saved memory. The second page table and the first page table are used as an example, memory saved by the first page table and the second page table=a first entry quantity×a memory size occupied by each entry in the second page table (or the first page table).

Figure 7:
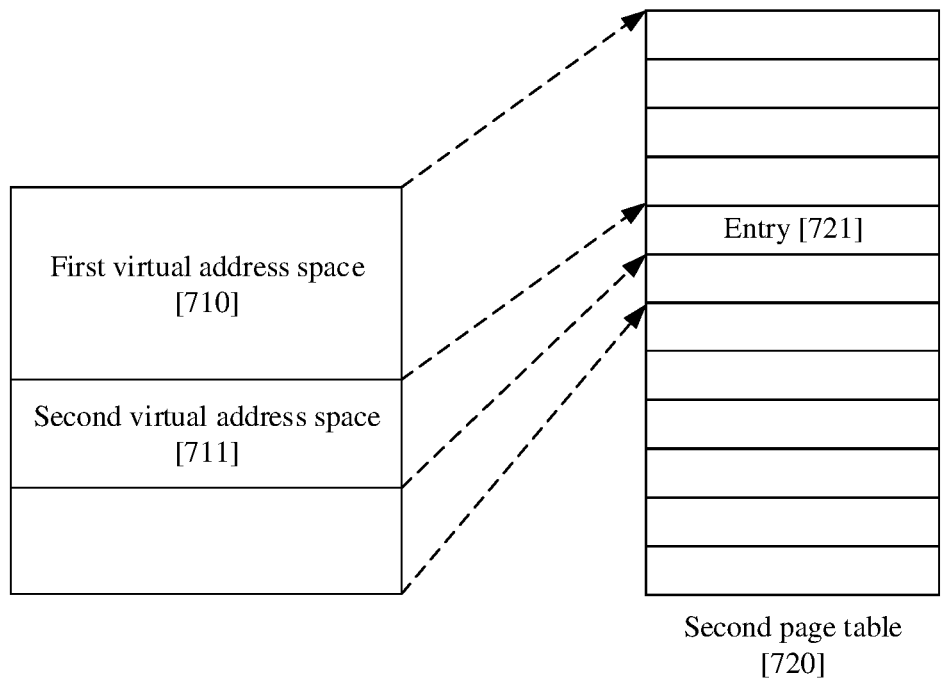
FIG. 7 is a schematic diagram of a logical relationship between a virtual address space and a page table according to an embodiment of this application.

FIG. 7 is a schematic diagram of a logical relationship between a virtual address space and a page table according to an embodiment of this application. It can be learned from FIG. 7 that virtual address space associated with a second page table 720 is a first virtual address space 710, the second page table 720 includes a plurality of entries 721, a virtual address space associated with each entry 721 is a second virtual address space 711, the second virtual address space is a subset of the first virtual address space, and a size of the first virtual address space=a quantity of entries 721*a size of the second virtual address space.

Certainly, in actual application, the first virtual address space may alternatively be obtained first. If the start virtual address of the first virtual address space is greater than 0, the fourth entry index address in the second page table may be greater than the base address of the second page table. Therefore, the page table descriptor of the second page table may be sequentially offset downward by the entries of the first entry quantity corresponding to the second page table, to obtain the first page table.

Figure 8:
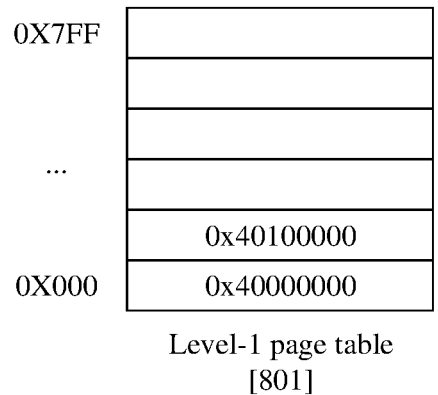
FIG. 8 is a schematic diagram of a page table according to an embodiment of this application.

Optionally, the first virtual address space is kernel mode address space. It can be learned from FIG. 5 that storage space of the first virtual address space is 2 GB, an address range is [0x80000000, 0xFFFFFFFF], and a start virtual address is 0x80000000. A second page table corresponding to the kernel mode address space is a level-1 page table 502. Each entry corresponds to 1 MB second virtual address space, each entry occupies 4B memory, and a fourth entry index address corresponding to the start virtual address in the level-1 page table 502 is 0X800. Because 0X800 is greater than the base address 0X00 of the level-1 page table, 0X00 to 0X7FF in the level-1 page table 502 have a total of 2 GB/1 MB=2K entries that are not used. In this case, if the level-1 page table 502 is offset, a maximum of 2K entries may be offset. When a page table descriptor in the level-1 page table 502 is offset downward by 2K entries, it is obtained that the first page table is a level-1 page table 801, as shown in FIG. 8. In the level-1 page table 801, a second entry index address is 0X00. A physical address associated with 0X00 is the same as a physical address associated with 0X800 in the level-1 page table 502 in FIG. 5, and both are 0x40000000. However, compared with the level-1 page table 502, it can be learned that the level-1 page table 801 saves memory of 2K*4B=8 KB.

It should be noted that offset manners of secondary page tables such as the level-2 page table and the level-3 page table may be similar to offset manners of the level-1 page table. Details are not described in this embodiment of this application.

S602: Configure a register.

The register configuration may include adding an offset indicator bit to a reserved bit of the TTBCR and setting the offset indicator bit to a first indicator or a second indicator, and may further include specifying a TTBR for which address virtual mapping is currently performed.

Optionally, an ALU used to implement a virtual address offset operation may be added to an MMU.

S603: Enable an MMU function.

To achieve compatibility with the conventional technology and reduce user perception, an offset indicator bit (denoted as offset 1) may be added to the reserved bit of the TTBCR to indicate whether to offset the virtual address. If the offset 1 is set to 1, it indicates that an offset function is enabled, and the ALU performs offset calculation on the virtual address. If the offset 1 is set to 0, it indicates that the offset function is disabled, and the ALU does not perform an offset operation on the virtual address, or directly transmits the virtual address to a subsequent functional module. In addition, the TTBR currently used for the virtual-physical address mapping may be indicated through the TTBCR.

For example, in a startup process of the operating system, the offset indicator bit may be configured by using the following instruction, to instruct to enable the offset function:

orr r12, #(1<<3); and mcr p15, 0, r12, c2, c0, 2.

"orr" is a position-1 instruction, and is used to perform an OR logical operation on two operands and place a result in a destination register. "orr r12, #(1<<3)" may represent setting r12 to 1. "mcr" is an operation instruction of a coprocessor CP15. TTBCR may be located in the coprocessor CP15. "mcr p15, 0, r12, c2, c0, 2" represents writing r12 to c1 of the CP15. In this case, the offset 1 of the TTBCR 113 may be set to 1 through the foregoing instruction, so as to instruct to enable the offset function.

It should be noted that, in this embodiment of this application, the offset indicator bit in the TTBCR is used to indicate whether to offset the virtual address. When the offset indicator bit is 1, the offset indicator bit can be used as page table offset flag information indicating that the virtual address is offset. However, it may be understood that, in actual application, information in another form may be used as the page table offset flag information. A form of the page table offset flag information is not specifically limited in this embodiment of this application.

In addition, in another possible implementation, the page table offset flag information may not be set, including that the offset indicator bit is not added to the reserved bit of the TTBCR. In this case, in a subsequent process of determining the physical address, the page table offset flag information does not need to be obtained.

It should be noted that, in actual application, S601 may also be performed on any occasion before S603.

After the MMU is initialized, the MMU can determine the physical address by performing the following steps.

Figure 9:
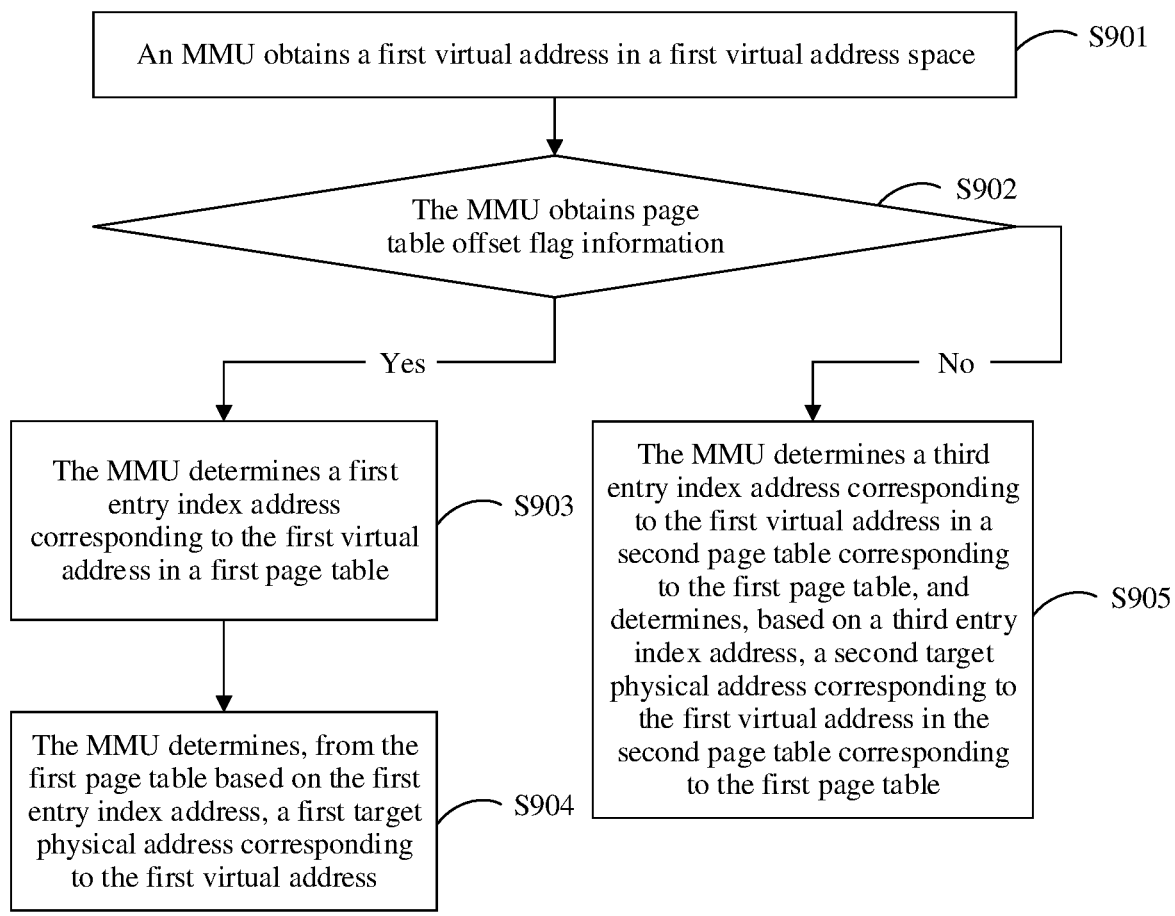
FIG. 9 is a flowchart of a method for determining a physical address according to an embodiment of this application.

FIG. 9 is a flowchart of a method for determining a physical address according to an embodiment of this application. It should be noted that the method is not limited to a specific sequence described in FIG. 9 and the following. It should be understood that in another embodiment, a sequence of some steps in the method may be exchanged according to an actual requirement, or some steps in the method may be omitted or deleted. The method includes the following steps.

S901: An MMU obtains a first virtual address in a first virtual address space.

Because a CPU needs to access memory in a running process, but the CPU directly accesses a virtual address, to convert the access into access for a physical address of the memory, the MMU may obtain a virtual address from the CPU. Because a first page table associated with the first virtual address space is an offset page table, different manners may be used to determine a first target physical address corresponding to the first virtual address in the first virtual address space and determine a physical address corresponding to a virtual address that does not belong to the first virtual address space. Therefore, to facilitate a manner used for subsequently determining the physical address corresponding to the virtual address, whether the virtual address is the first virtual address in the first virtual address space may be determined.

The MMU may determine an address range of the first virtual address space in advance, and compare the obtained virtual address with a start virtual address and an end virtual address of the first virtual address space. If the virtual address is greater than or equal to the start virtual address and less than or equal to an end virtual address, the virtual address may be determined as the first virtual address.

For example, referring to FIG. 5 and FIG. 8 again, the first virtual address space is the kernel mode address space, the address range of the first virtual address space is [0x80000000, 0xFFFFFFFF], a corresponding first page table is a level-1 page table 801, and the level-1 page table 801 is obtained by migrating the level-1 page table 502. Therefore, if the obtained first virtual address is any one of [0x80000000, 0xFFFFFFFF], S902 may be performed.

S902: The MMU obtains page table offset flag information. If the page table offset flag information is obtained, S903 is performed. If the page table offset flag information is not obtained, S905 is performed.

It can be learned from the foregoing that, in this embodiment of this application, the page table may be offset. Correspondingly, a manner of determining the physical address corresponding to the first virtual address is different from that when the page table is not offset. To enable the MMU to be compatible with two different manners of determining the physical address when the page table is offset or not offset, the page table offset flag information may be set, and the page table offset flag information is obtained when the physical address corresponding to the first virtual address is determined. If the page table offset flag information is obtained when the physical address corresponding to the first virtual address is determined, it may be determined that the page table is offset. In this case, the physical address may be determined in a corresponding manner in a subsequent step.

Optionally, the MMU may obtain an offset indicator bit in the TTBCR. If the offset indicator bit is a first indicator (for example, 1), the MMU may determine that the page table offset flag information is obtained, and S903 is performed. If the offset indicator bit is a second indicator (for example, 0), the MMU may determine that the page table offset flag information is not obtained, and S905 is performed.

Certainly, in an actual application, if the page table offset flag information further has another form, whether the page table offset flag information is obtained may also be determined in another corresponding manner. For example, in another possible implementation, an offset indication module may be additionally disposed in the MMU. The offset indication module may include a specific character string that can be used as the page table offset flag information. The specific character string may be obtained from the offset indication module. If the specific character string is obtained, it may be determined that the page table offset flag information is obtained. If the specific character string is not obtained, it may be determined that the page table offset flag information is not obtained.

It should be noted that, in an actual application, compatibility when the page table is not offset may not be considered, that is, S902 is not performed, but S903 is directly performed after S901. In other words, S902 is an optional step.

S903: The MMU determines a first entry index address corresponding to the first virtual address in the first page table.

It can be learned from the foregoing description that an entry in the page table includes an association relationship between an entry index address and a physical address. Therefore, to determine a first target physical address corresponding to the first virtual address, the first entry index address corresponding to the first virtual address in the first page table may be first determined.

In a possible implementation, when the MMU determines the first entry index address corresponding to the first virtual address in the first page table, because a page table descriptor stored in an entry in the first page table before and after offset may change, and a physical address associated with the entry may also change, that is, an entry index associated with a same physical address changes, the first entry index address corresponding to the first virtual address in the first page table may be determined in the following manner 1 or manner 2.

Manner 1: The MMU determines a second virtual address based on the first virtual address and a first offset value. The MMU determines the first entry index address based on the second virtual address. The first virtual address is greater than the second virtual address. In other words, the second virtual address is equal to a value obtained by subtracting the first offset value from the first virtual address.

In the manner 1, the MMU first performs a corresponding offset on the first virtual address.

The MMU may determine the second virtual address based on the first virtual address and the first offset value by using an ALU.

It should be noted that the first offset value may be determined in advance, and the first offset value may be less than or equal to the start virtual address of the first virtual address space. The first offset value=a first entry quantity corresponding to the first page table*a size of a second virtual address space associated with each entry in the first page table, and the second virtual address=the first virtual address—the first offset value.

For example, an operating system of an electronic device is 32 bits. As shown in FIG. 5 and FIG. 8, the first page table is a level-1 page table, the level-1 page table is offset downward by 2K entries, and a page table descriptor in each entry is associated with 1 MB virtual address space. In this case, the first offset value=2K*1 MB=2 GB, that is, 0x80000000.

When completing offsetting on the first virtual address and determining the second virtual address, the MMU may determine a base address of the first page table, and determine the first entry index address based on the base address of the first page table and the second virtual address. In addition, when the first target physical address corresponding to the first virtual address is determined, searching is sequentially performed from the level-1 page table, a level-2 page table, a level-3 page table . . . , until the corresponding first target physical address is found. Therefore, the first entry index address may be determined based on the base address of the first page table and the second virtual address in the following two possible implementations:

In a possible implementation, when the first page table is the level-1 page table, the first virtual address may be compared with a virtual address space corresponding to each TTBR. If the first virtual address belongs to a virtual address space (a first virtual space may be a subset of the virtual address space corresponding to a TTBR) corresponding to the TTBR, the base address of the first page table is obtained from the TTBR corresponding to the virtual address space. A sum of the base address of the first page table and a level-1 page table index bit in the second virtual address is determined as the first entry index address.

Figure 10:
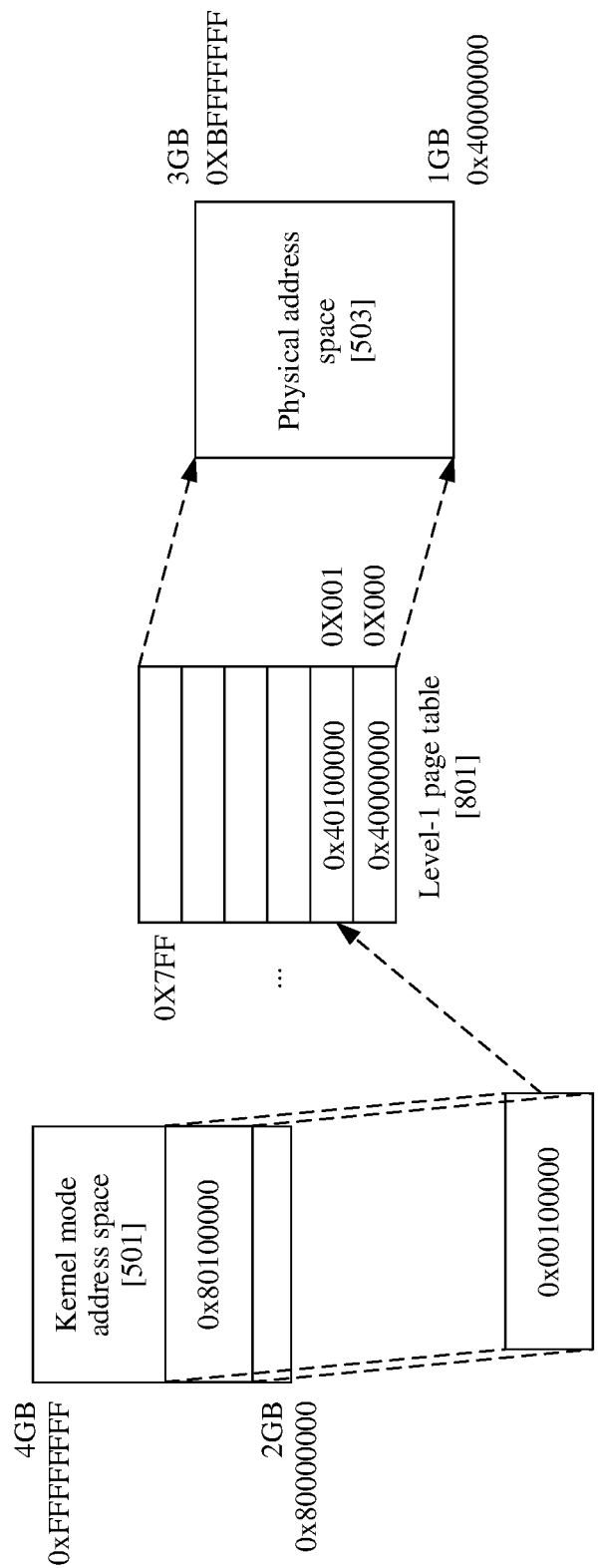
FIG. 10 is a schematic diagram of another logical relationship among a virtual address space, a page table, and a physical address space according to an embodiment of this application.

To describe the manner 1 in detail, FIG. 10 is a schematic diagram of a logical relationship between a virtual address space, a page table, and a physical address space according to an embodiment of this application. The operating system in the electronic device is 32 bits, the first virtual address space is a kernel mode address space 501, and an address range is [0x80000000, 0xFFFFFFFF]. For example, the first virtual address in the first virtual address space is 0x80100000. An MMU may determine that a TTBR corresponding to a kernel mode address space 501 is a TTBR 1, and obtain, from the TTBR 1, a base address 0X000 of a level-1 page table 801. It can be learned from a page table descriptor in a 0X000 entry that, if mapping level indicator bits [1:0] of a page table descriptor are 10, and a granularity indicator bit [18] is 0, it is determined that current mapping is level-1 mapping, and a mapping granularity is 1 MB. Therefore, the first virtual address is offset downward by 0x80000000, to obtain a second virtual address 0x00100000, where $[31:20]^{th}$ bits in the second virtual address are level-1 page table index bits, and $[19:0]^{th}$ bits are segment offset bits. The MMU determines a sum 0X001 of the $[31:20]^{th}$ bits 0X001 of the first virtual address and the base address 0X000 of the level-1 page table as the first entry index address, where a page table descriptor in the 0X001 entry can indicate that a first target physical address associated with 0x80100000 is 0x40100000. Certainly, if the mapping level indicator bits [1:0] of the page table descriptor are 01, it is determined that a level-2 page table is further included. The $[31:20]^{th}$ bits of the page table descriptor are base addresses of the level-2 page table. Correspondingly, the $[31:20]^{th}$ bits in the second virtual address are the level-1 page table index bits, $[19:12]^{th}$ bits are level-2 page table index bits, and $[11:0]^{th}$ bits are page offset bits.

In another possible implementation, when the first page table is a secondary page table, the base address of the first page table may be determined based on a third page table, and the first entry index address is determined based on the base address of the first page table and the second virtual address, where the third page table is a previous-level page table adjacent to the first page table.

For example, the first page table is the level-2 page table, and the third page table is the level-1 page table. The MMU may obtain a base address of the level-2 page table from the page table descriptor based on a granularity indicator bit of a page table descriptor in the third page table, obtain a level-2 page table index bit from the first virtual address space, and determine a sum of the base address of the level-2 page table and the level-2 page table index bit as the first entry index address.

For example, the operating system in the electronic device is 32 bits, and the MMU determines that the mapping level indicator bits [1:0] of the page table descriptor that are in the level-1 page table and that correspond to the first virtual address are 01, that is, determines that the level-2 page table is further included. In this case, the $[31:20]^{th}$ bits of the page table descriptor are obtained as the base addresses of the level-2 page table, the $[19:12]^{th}$ bits of the second virtual address are obtained as level-2 page table index bits, and a sum of the base addresses of the level-2 page table and the level-2 page table index bits is determined as the first entry index address.

It should be noted that, when the first page table is another secondary page table, a manner of determining the first entry index address based on the second virtual address may be similar to a manner when the first page table is a secondary page table. Details are not described herein again.

Manner 2: The MMU determines, based on the first virtual address, a third entry index address to be offset, and determines the first entry index address based on the third entry index address and the second offset value.

When the first page table is the level-1 page table, the MMU may determine the base address of the level-1 page table in a manner similar to the foregoing manner, obtain a level-1 page table index bit from the first virtual address, determine a sum of the level-1 page table index bit and the base address of the level-1 page table as the third entry index address, and then offset the third entry index address, including subtracting the second offset value from the third entry index address, to obtain a first entry index address.

It should be noted that the second offset value may be determined in advance, and the second offset value=a first entry quantity.

Figure 11:
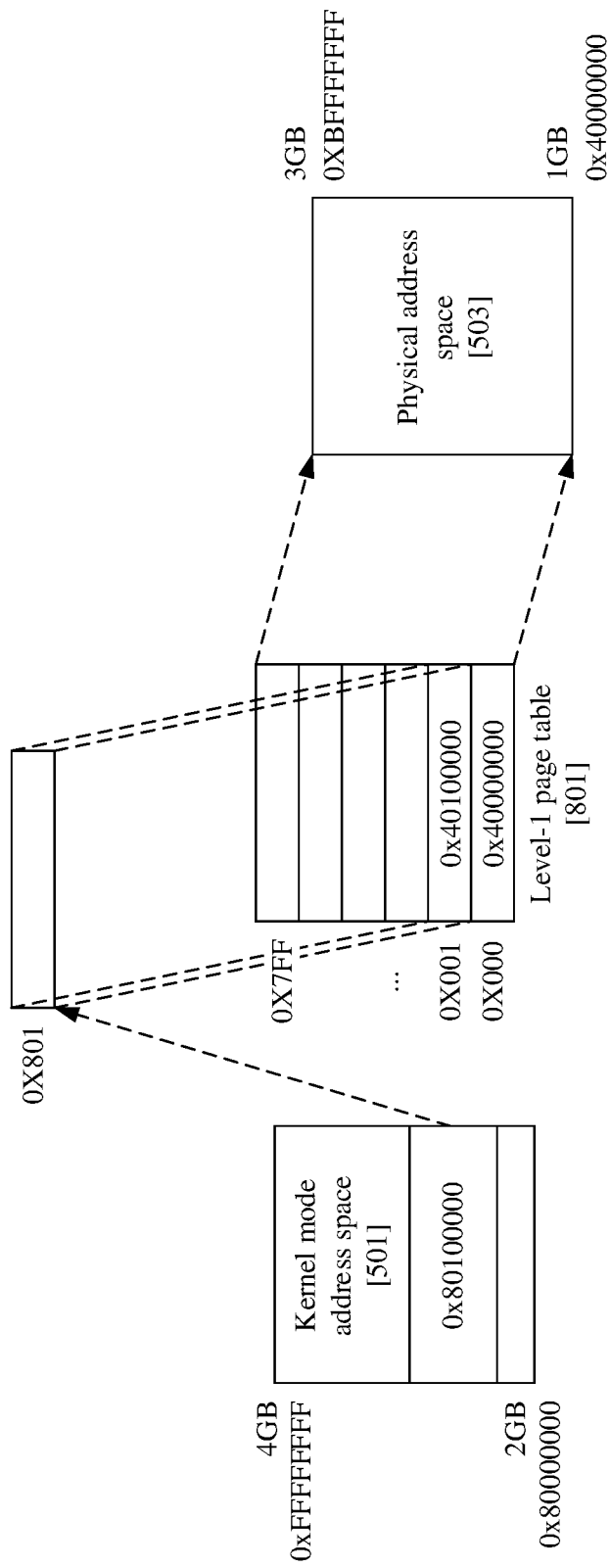
FIG. 11 is a schematic diagram of another logical relationship among a virtual address space, a page table, and a physical address space according to an embodiment of this application.

To describe the manner 2 in detail, FIG. 11 is a schematic diagram of a logical relationship between a virtual address space, a page table, and a physical address space according to an embodiment of this application. An operating system in an electronic device is 32 bits, the first virtual address space is a kernel mode address space 501, and an address range is [0x80000000, 0xFFFFFFFF]. A first virtual address in the first virtual address space is 0x80100000. An MMU may determine that a TTBR corresponding to the kernel mode address space 501 is a TTBR 1, and obtain, from the TTBR 1, a base address 0X000 of a level-1 page table 801. It can be learned from the page table descriptor in the 0X000 entry that, if mapping level indicator bits [1:0] of the page table descriptor are 10, and a granularity indicator bit [18] is 0, it is determined that the current mapping is level-1 mapping, and a mapping granularity is 1 MB. Therefore, $[31:20]^{th}$ bits in 0x80100000 in the first virtual address are level-1 page table index bits, and $[19:0]^{th}$ bits are segment offset bits. The MMU determines a sum 0X801 of the $[31:20]^{th}$ bits 0X801 of the first virtual address and the base address 0X000 of the level-1 page table as a third entry index address, and then determines a difference obtained by subtracting a first entry quantity 0X800 (a hexadecimal value corresponding to a binary value 2K) from the third entry index address (0X801) as the first entry index address 0X001.

S904: The MMU determines, from the first page table based on the first entry index address, a first target physical address corresponding to the first virtual address.

Because the first entry index address is an entry index address corresponding to the first virtual address, an entry corresponding to the first virtual address in the first page table may be determined based on the first entry index address, and the first target physical address is determined based on the entry.

When the first page table is a last-level page table (for example, a level-1 page table in level-1 mapping or a level-2 page table in level-2 mapping), the page table descriptor in the entry corresponding to the first entry index address may indicate a base address of the first target physical address. Therefore, the MMU may obtain the base address of the first target physical address from the page table descriptor, obtain a physical address offset bit from the first virtual address or the second virtual address, and determine a sum of the base address of the first target physical address and the physical address offset bit as the first target physical address. When the first page table is not the last-level page table, the first representation index address may indicate a base address of a next-level page table. The MMU may continue to search the next-level page table for the first entry index address corresponding to the first virtual address until the last-level page table is found, so as to determine the first target physical address. In other words, the MMU may perform S903 and S904 at least once, to determine the first target physical address corresponding to the first virtual address by sequentially obtaining the level-1 page table, the level-2 page table, the level-3 page table, and the like.

It should be noted that, when the first virtual address is offset, the offset is actually the at least level-1 page table index bit in the first virtual address, and the physical address offset bit does not change. Therefore, the MMU may obtain the physical address offset bit from the first virtual address or the second virtual address.

Still refer to FIG. 10 and FIG. 11. Because the first page table is the level-1 page table 801, a page table descriptor in a 0X001 entry in the level-1 page table 801 indicates the base address 0x40100000 of the first target physical address corresponding to the first virtual address 0x80100000, and both the first virtual address 0x80100000 and the $[19:0]^{th}$ bits of the second virtual address are 0, that is, the physical address offset bit is 0. Therefore, the first target physical address is 0x40100000+0x00000000=0x40100000. Certainly, if the mapping level indicator bits [1:0] of the page table descriptor are 01, it is determined that the level-2 page table is further included, and the $[31:20]^{th}$ bits of the page table descriptor are base addresses of the level-2 page table. In this case, S605 may be returned, to determine the first target physical address from the level-2 page table.

It can be learned from the foregoing that, in a process of determining the first target physical address corresponding to the first virtual address, the MMU may need to search for a plurality of levels of page tables. The first page table may be any level of page table, that is, any page table may have an offset. If the MMU first offsets the first virtual address to obtain the second virtual address, and then determines the corresponding first entry index address from the first page table based on the second virtual address, regardless of which page tables in the plurality of levels of page tables are offset, the obtained second virtual address may match the offset page table provided that the first virtual address is offset at least once. If the MMU first determines the third entry index address based on the first virtual address, and then offsets the third entry index address to obtain the first entry index address, when determining the first entry index address in the offset page table at each layer, the MMU may separately offset the third entry index address for the page table to obtain the first entry index address.

S905: Determine a third entry index address corresponding to the first virtual address in the second page table corresponding to the first page table, and determine, from the second page table corresponding to the first page table based on the third entry index address, a second target physical address corresponding to the first virtual address.

An operation manner of S905 may be similar to that of S903 and S904, and a difference lies in that the first virtual address or the third entry address does not need to be offset in S905.

It should be noted that, in this embodiment of this application, the first page table is obtained by offsetting the entries in the second page table. Therefore, the first target physical address determined from the first page table by using S903 and S904 may be the same as the second target physical address determined from the second page table by using S905. The memory of the electronic device may store only the first page table or the second page table. If the first page table is stored, the MMU can obtain the page table offset flag information in S902, so as to perform S903 and S904. If the second page table is stored, the MMU cannot obtain the page table offset flag information in S902, and therefore S905 is performed.

It may be understood that if the MMU determines the first target physical address and the second target physical address from a same page table (the first page table or the second page table) separately based on S903, S304, and S905, the determined first target physical address and the determined second target physical address may be different.

In this embodiment of this application, when obtaining the first virtual address in the first virtual address space, the MMU may determine the first entry index address corresponding to the first virtual address in the first page table, and determine, from the first page table based on the first entry index address, the first target physical address corresponding to the first virtual address. The first page table may be used to determine a physical address corresponding to each virtual address in the first virtual address space, the start virtual address of the first virtual address space corresponds to the second entry index address in the first page table, the second entry index address is greater than or equal to the base address of the first page table, and is less than the sum of the base address of the first page table and the quotient of dividing the start virtual address by the size of the second virtual address space, the largest entry index address of the first page table is less than the sum of the base address of the first page table and the quotient of dividing the largest virtual address of the first virtual address space by the size of the second virtual address space, and the second virtual address space is virtual address space associated with any entry in the first page table. Therefore, the first page table may include at least an entry actually required by the first virtual address space. This saves memory and improves memory utilization.

In addition, in this embodiment of this application, a page table descriptor in the second page table including a redundant entry is offset downward, to reduce or eliminate redundant entries, to obtain the first page table including fewer entries. In actual application, to make a manner of setting a page table and determining a physical address more flexible, the second page table may also be offset upward (that is, in a high address direction). In this case, the second page table may be any page table, a quantity of third entries offset upward may also be any value, and the obtained first page table may include more entries. Correspondingly, when determining the first entry index address corresponding to the first virtual address, the MMU may determine a sum of the first virtual address and the first offset value as the second virtual address (that is, the first virtual address is also offset in the high address direction), and then determine the first entry index address based on the second virtual address, or may determine a to-be-offset third entry index address based on the first virtual address, and determine a sum of the third entry index address and the second offset value as the first entry index address (that is, the third entry index address is also offset in the high address direction). When the first entry index address is determined, the first target physical address corresponding to the first virtual address is determined from the first page table based on the first entry index address.

The first offset value=the third entry quantity*the size of the second virtual address space associated with each entry in the first page table, the second offset value=the third entry quantity, the first virtual address may be less than the second virtual address, and the third entry index address may be less than the first entry index address.

Based on a same inventive concept, an embodiment of this application further provides a chip system 1200.

Figure 12:
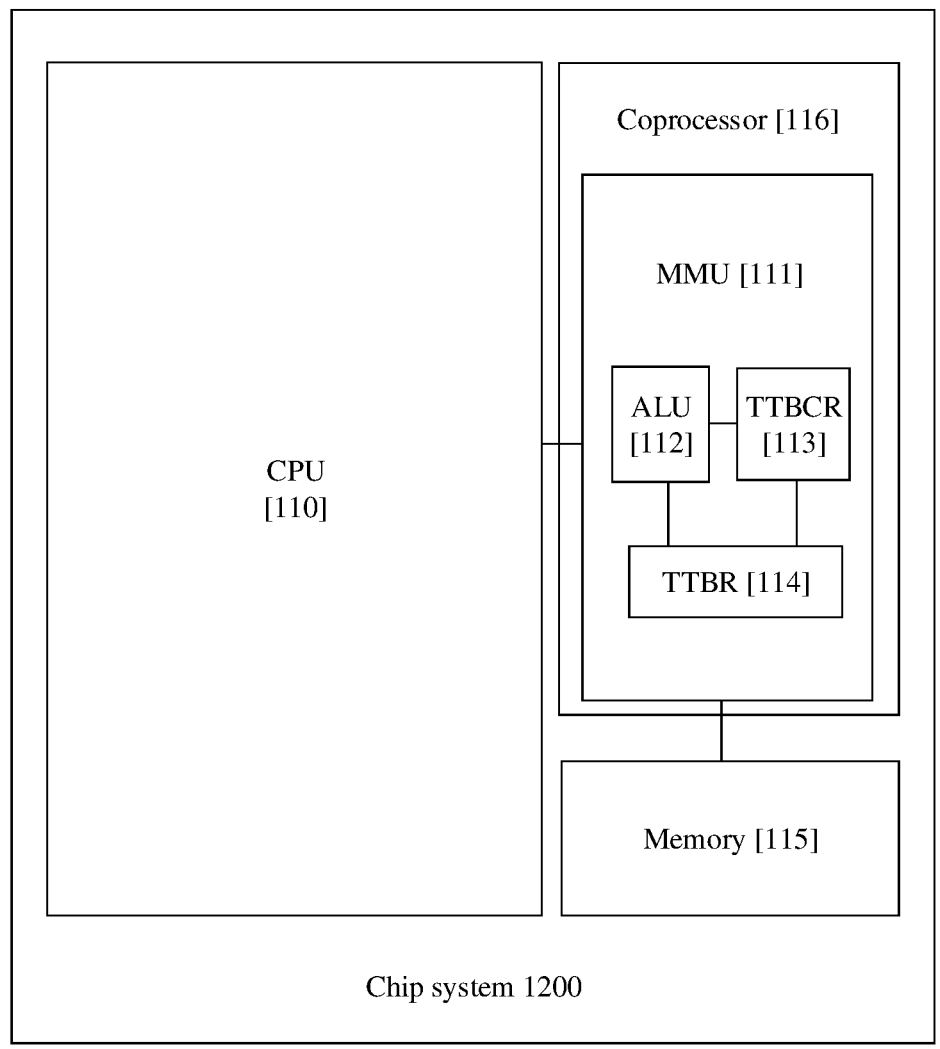
FIG. 12 is a schematic diagram of a structure of a chip system according to an embodiment of this application.

Refer to FIG. 12. The chip system 1200 includes at least one CPU 110 (only one is shown in FIG. 12), at least one memory 115 (only one is shown in FIG. 12), and at least one coprocessor 116 (only one is shown in FIG. 12). The at least one coprocessor 116 includes at least one MMU 111 (only one is shown in FIG. 12). The MMU 111 includes at least one ALU 112 (only one is shown in FIG. 12), at least one TTBCR 113 (only one is shown in FIG. 12), and at least one TTBR 114 (only one is shown in FIG. 12).

The at least one MMU 111 is configured to:
  when an access request initiated by the at least one CPU 110 for the at least one memory 115 is received, and the access request carries a first virtual address of the first virtual address space, determine a first entry index address corresponding to the first virtual address; and
  determine, from a first page table based on the first entry index address, a first target physical address corresponding to the first virtual address.

The first page table is used to determine a physical address corresponding to each virtual address in the first virtual address space, a start virtual address of the first virtual address space corresponds to a second entry index address in the first page table, the second entry index address is greater than or equal to a base address of the first page table and less than a sum of the base address of the first page table and a quotient of dividing the start virtual address by a size of a second virtual address space, a largest entry index address of the first page table is less than a sum of the base address of the first page table and a quotient of dividing a largest virtual address of the first virtual address space by the size of the second virtual address space, and the second virtual address space is virtual address space associated with any entry in the first page table.

Optionally, the at least one ALU 112 is configured to determine a second virtual address based on a first virtual address and a first offset value, where the first virtual address is greater than the second virtual address.

The at least one MMU 110 is further configured to determine a first entry index address based on the second virtual address.

Optionally, the at least one MMU 110 is further configured to:
  determine, based on the first virtual address, a third entry index address to be offset; and
  determine the first entry index address based on the third entry index address and a second offset value, where the third entry index address is greater than the first entry index address.

Optionally, the at least one MMU 110 is further configured to:
  obtain page table offset flag information, where the page table offset flag information is indicated by an offset indicator bit in the at least one TTBCR 113.

Optionally, each TTBR 114 may store a base address of one level-1 page table. Correspondingly, the TTBCR 113 may be used to indicate TTBRs 114 selected when physical addresses corresponding to virtual addresses in different virtual address spaces are determined. In other words, the TTBRs 114 corresponding to different virtual address spaces are determined.

Optionally, the at least one coprocessor 116 may be integrated into at least one CPU 1210.

It should be noted that the memory 115 may include an internal memory 121 in FIG. 1.

Figure 13:
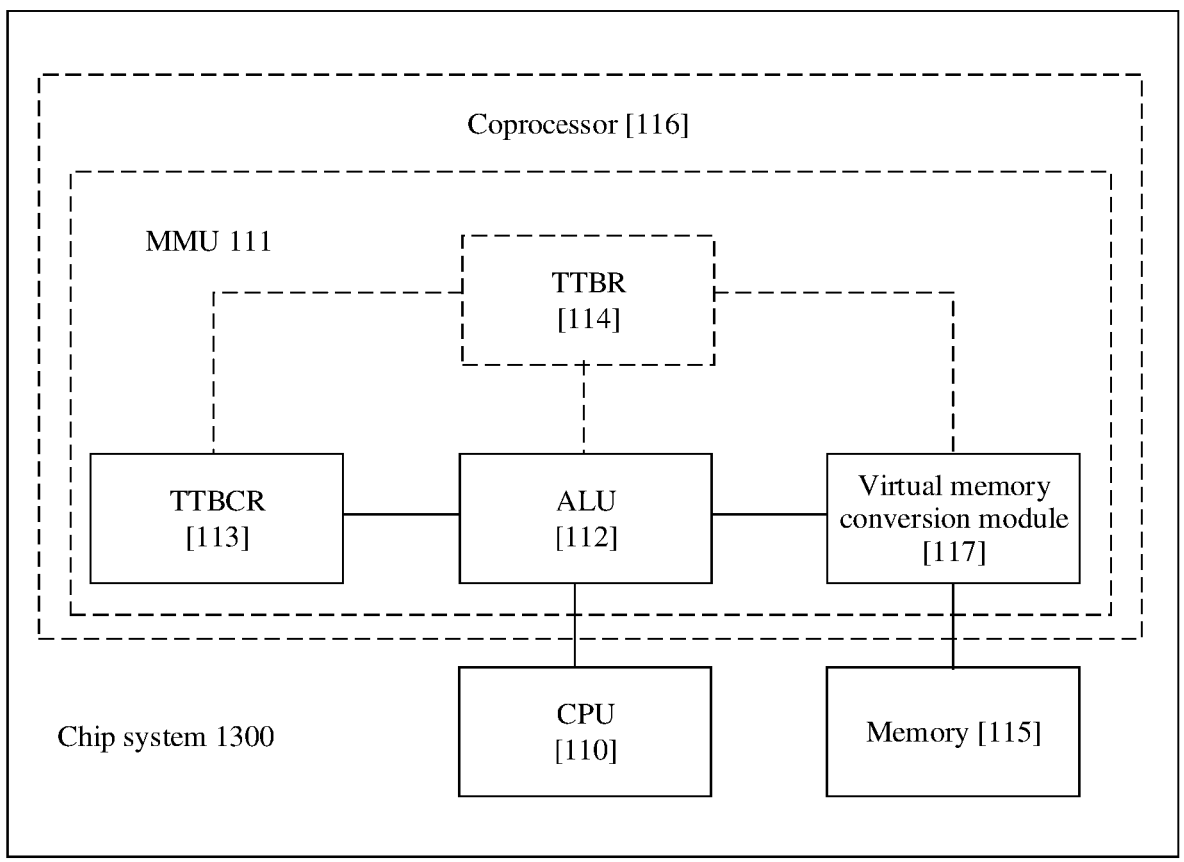
FIG. 13 is a schematic diagram of a structure of another chip system according to an embodiment of this application.

FIG. 13 is a schematic diagram of a structure of another chip system 1300 according to an embodiment of this application. The system 1300 includes a CPU 110, an ALU 112, a TTBCR 113, a virtual memory conversion module 117, and a memory 115, where the TTBCR 113, the ALU 112, and the virtual memory conversion module 117 may be disposed in an MMU 111, and the MMU in may be disposed in a coprocessor, or may be integrated in the CPU 110.

The CPU 110 may send an access request to the memory 115, where the access request carries a first virtual address of a kernel mode address space. When obtaining the first virtual address and determining that an offset indicator bit in the TTBCR 113 is a first indicator (for example, offset 1), the ALU 112 offsets the first virtual address to a second virtual address. The virtual memory conversion module 117 determines, based on the second virtual address, a first entry index address from a page table set corresponding to the kernel mode address space, and further determines a first target physical address. The CPU 110 may access an internal memory 1350 based on the first target physical address.

It should be noted that the ALU 112, the TTBCR 113, and the virtual memory conversion module 117 may be disposed in the MMU 111, and the MMU 111 may further include a TTBR 114.

It should be further noted that the virtual memory conversion module 117 may be configured to determine the first entry index address based on a third entry index address and a second offset value.

Based on a same inventive concept, an embodiment of this application further provides an electronic device. The electronic device includes any one of the foregoing chip systems.

An embodiment of this application further provides a computer-readable storage medium. The computer-readable storage medium stores a computer program. When the computer program is executed by a processor, the method in the foregoing method embodiment is implemented.

An embodiment of this application further provides a computer program product. When the computer program product runs on an electronic device, the electronic device is enabled to perform the method in the foregoing method embodiments.

When the foregoing integrated unit is implemented in the form of a software functional unit and sold or used as an independent product, the integrated unit may be stored in a computer-readable storage medium. Based on such an understanding, all or some of the procedures of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable storage medium may include at least any entity or apparatus capable of carrying the computer program code to a photographing apparatus/terminal device, a recording medium, a computer memory, a read-only memory (read-only memory, ROM), a random access memory (random access memory, RAM), an electrical carrier signal, a telecommunications signal, and a software distribution medium, for example, a USB flash drive, a removable hard disk, a magnetic disk, or an optical disc. In some jurisdictions, the computer-readable medium cannot be the electrical carrier signal or the telecommunication signal according to legislation and patent practices.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/device and method may be implemented in other manners. For example, the described apparatus/device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of this application, the terms "first", "second", "third", and the like are merely intended for a purpose of differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method, comprising:
    when a first virtual address of a first virtual address space is obtained, determining a first entry index address corresponding to the first virtual address; and
    determining, from a first page table based on the first entry index address, a first target physical address corresponding to the first virtual address, and wherein:
        the first page table is usable to determine a physical address corresponding to each virtual address in the first virtual address space, a start virtual address of the first virtual address space corresponds to a second entry index address in the first page table, the second entry index address is greater than or equal to a base address of the first page table and less than a sum of the base address of the first page table and a quotient of dividing the start virtual address by a size of a second virtual address space, a largest entry index address of the first page table is less than a sum of the base address of the first page table and a quotient of dividing a largest virtual address of the first virtual address space by the size of the second virtual address space, and the second virtual address space is virtual address space associated with at least one entry in the first page table.

2. The method according to claim 1, wherein determining the first entry index address corresponding to the first virtual address comprises:
    determining a second virtual address based on the first virtual address and a first offset value, wherein the first virtual address is greater than the second virtual address; and
    determining the first entry index address based on the second virtual address.

3. The method according to claim 2, wherein before determining the first entry index address corresponding to the first virtual address, the method further comprises:
    obtaining page table offset flag information, wherein the page table offset flag information is indicated by an offset indicator bit in a translation table base control register (TTBCR).

4. The method according to claim 2, wherein:
    the first page table comprises a level-1 page table or a level-2 page table; or
    the first virtual address space is a kernel mode address space.

5. The method according to claim 1, wherein determining the first entry index address corresponding to the first virtual address comprises:
    determining, based on the first virtual address, a third entry index address; and
    determining the first entry index address based on the third entry index address and a second offset value, wherein the third entry index address is greater than the first entry index address.

6. The method according to claim 1, wherein before determining the first entry index address corresponding to the first virtual address, the method further comprises:
    obtaining page table offset flag information, wherein the page table offset flag information is indicated by an offset indicator bit in a translation table base control register (TTBCR).

7. The method according to claim 1, wherein:
    the first page table comprises a level-1 page table or a level-2 page table; or
    the first virtual address space is a kernel mode address space.

8. A chip system, comprising:
    at least one central processing unit (CPU);
    at least one memory; and
    at least one coprocessor, and the at least one coprocessor comprises at least one memory management unit (MMU), the at least one MMU is configured to:
        when an access request initiated by the at least one CPU for the at least one memory is received, and the access request carries a first virtual address of a first virtual address space, determine a first entry index address corresponding to the first virtual address; and
        determine, from a first page table based on the first entry index address, a first target physical address corresponding to the first virtual address, and wherein:
            the first page table is usable to determine a physical address corresponding to each virtual address in the first virtual address space, a start virtual address of the first virtual address space corresponds to a second entry index address in the first page table, the second entry index address is greater than or equal to a base address of the first page table and less than a sum of the base address of the first page table and a quotient of dividing the start virtual address by a size of a second virtual address space, a largest entry index address of the first page table is less than a sum of the base address of the first page table and a quotient of dividing a largest virtual address of the first virtual address space by the size of the second virtual address space, and the second virtual address space is virtual address space associated with at least one entry in the first page table.

9. The chip system according to claim 8, wherein the at least one MMU comprises at least one arithmetic logic unit (ALU), and wherein:
the at least one ALU is configured to determine a second virtual address based on the first virtual address and a first offset value, wherein the first virtual address is greater than the second virtual address; and
the at least one MMU is further configured to determine the first entry index address based on the second virtual address.

10. The chip system according to claim 9, wherein the at least one MMU further comprises at least one translation table base control register (TTBCR), and the at least one MMU is further configured to:
obtain page table offset flag information, wherein the page table offset flag information is indicated by an offset indicator bit in the at least one TTBCR.

11. An electronic device, comprising the chip system according to claim 10.

12. An electronic device, comprising the chip system according to claim 9.

13. The chip system according to claim 8, wherein the at least one MMU is further configured to:
determine, based on the first virtual address, a third entry index address; and
determine the first entry index address based on the third entry index address and a second offset value, wherein the third entry index address is greater than the first entry index address.

14. The chip system according to claim 13, wherein the at least one MMU further comprises at least one translation table base control register (TTBCR), and the at least one MMU is further configured to:
obtain page table offset flag information, wherein the page table offset flag information is indicated by an offset indicator bit in the at least one TTBCR.

15. An electronic device, comprising the chip system according to claim 14.

16. An electronic device, comprising the chip system according to claim 13.

17. The chip system according to claim 8, wherein the at least one MMU further comprises at least one translation table base control register (TTBCR), and the at least one MMU is further configured to:
obtain page table offset flag information, wherein the page table offset flag information is indicated by an offset indicator bit in the at least one TTBCR.

18. An electronic device, comprising the chip system according to claim 17.

19. An electronic device, comprising the chip system according to claim 8.

* * * * *